US011165865B2

(12) United States Patent
Stute (10) Patent No.: US 11,165,865 B2
(45) Date of Patent: *Nov. 2, 2021

(54) MULTI-LAYER DATA STORAGE SYSTEM

(71) Applicant: Masergy Communications, Inc., Plano, TX (US)

(72) Inventor: Michael Roy Stute, Crystal River, FL (US)

(73) Assignee: MASERGY COMMUNICATIONS, INC., Plano, TX (US)

( * ) Notice: Subject to any disclaimer, the term of this patent is extended or adjusted under 35 U.S.C. 154(b) by 228 days.

This patent is subject to a terminal disclaimer.

(21) Appl. No.: 16/433,854

(22) Filed: Jun. 6, 2019

(65) Prior Publication Data

US 2019/0289072 A1    Sep. 19, 2019

Related U.S. Application Data

(63) Continuation of application No. 15/148,764, filed on May 6, 2016, now Pat. No. 10,356,174.

(51) Int. Cl.
*G06F 16/20* (2019.01)
*H04L 29/08* (2006.01)
*G06F 16/27* (2019.01)

(52) U.S. Cl.
CPC ........ *H04L 67/1097* (2013.01); *G06F 16/278* (2019.01)

(58) Field of Classification Search
CPC .......................... G06F 16/278; H04L 67/1097
See application file for complete search history.

(56) References Cited

U.S. PATENT DOCUMENTS

| 9,235,611 | B1 | 1/2016 | Murray et al. | |
|---|---|---|---|---|
| 9,330,158 | B1 | 5/2016 | Xiao et al. | |
| 9,355,109 | B2* | 5/2016 | Archak | G06F 12/0802 |
| 2013/0332612 | A1* | 12/2013 | Cai | H04L 47/70 709/226 |
| 2015/0127658 | A1* | 5/2015 | Ding | G06F 16/2255 707/747 |
| 2017/0177601 | A1* | 6/2017 | Borate | G06F 16/2228 |

OTHER PUBLICATIONS

Extended European Search Report dated Oct. 4, 2017; European Patent Application No. 17169911.9.

* cited by examiner

*Primary Examiner* — Tarek Chbouki
(74) *Attorney, Agent, or Firm* — McGuireWoods LLP (57) ABSTRACT

The disclosed embodiments include data storage systems and methods to store data. In one embodiment, the system includes a storage medium having a plurality of partitions for storing data values of a dataset. The system also includes a system manager operable to receive a data value connected to the system manager and assign a plurality of data subsets of the dataset to the plurality of partitions. The system also includes a key manager operable to assign a key of a key space to each data value of the dataset. The system also includes a top layer data manager and at least one bottom layer data manager, each bottom layer data manager assigned to a data subset. The top layer data manager passes data values to the at least one bottom layer data manager. The system also includes an allocation manager operable to dynamically readjust a storage space of the partition.

20 Claims, 7 Drawing Sheets

MULTI-LAYER DATA STORAGE SYSTEM

CROSS REFERENCE TO OTHER APPLICATIONS

This application is a continuation of co-pending U.S. patent application Ser. No. 15/148,764 filed May 6, 2016 which is incorporated herein by reference for all purposes.

BACKGROUND

The present disclosure relates generally to data storage systems and methods to store data.

External data sources often transmit various data values belonging to one or more datasets to one or more data storage systems for storage and for re-transmission of the data values. Data storage systems often include or are communicatively connected to data storage mediums for storing internal data as well as data obtained from one or more external data sources. The data storage mediums may have one or more data storage components such as read-only memory (ROM), random access memory (RAM), flash memory, magnetic hard drives, solid state hard drives, CD-ROM drives, DVD drives, floppy disk drives, as well as other types of data storage components.

A data storage medium may be configured to store different types of data received by a data storage system. In that regard, each type of data of a dataset may be allocated a section (partition) of the data storage medium. The data storage system typically does not predetermine which data values of the dataset are transmitted by the external data sources until receipt of the data values. Further, the data storage system typically receives different types of data at different rates. Over time, certain partitions of the storage medium may be saturated with data values while other partitions of the storage medium may be under-utilized or may not contain any data value. One conventional solution is to augment the storage medium to have enough storage to store every data value of the dataset. However, since the data storage system may likely never receive some data values of the dataset, such solution is not only cost prohibitive, but also inefficiently utilizes available storage space of the data storage medium.

BRIEF DESCRIPTION OF THE DRAWINGS

Illustrative embodiments of the present invention are described in detail below with reference to the attached drawing Figures, which are incorporated by reference herein, and wherein.

The illustrated figures are only exemplary and are not intended to assert or imply any limitation with regard to the environment, architecture, design, or process in which different embodiments may be implemented.

BRIEF SUMMARY OF THE DISCLOSED EMBODIMENTS

The disclosed embodiments provide systems and methods for storing data values. In accordance with one embodiment, a multi-layer data storage system is provided. The multi-layer data storage system includes a storage medium having a plurality of partitions for storing data values of a dataset. The multi-layer data storage system also includes a system manager operable to receive, over a network, a data value of the dataset from an external source communicatively connected to the system manager, the dataset having a plurality of data subsets. The system manager is also operable to assign the plurality of data subsets of the dataset to the plurality of partitions. The multi-layer data storage system further includes a key manager operable to assign a key of a key space to each data value of the dataset, each data subset of the dataset is assigned at least one key of the key space. The multi-layer data storage system a first top layer data manager operable to obtain a first set of keys of the key space and to divide the first set of keys into a first plurality of subsets of keys. The multi-layer data storage system further includes at least one bottom layer data manager. Each bottom layer data manager of the at least one bottom layer data manager is assigned a data subset of the plurality of data subsets. Each bottom layer data manager is operable to obtain at least one key of the first set of keys assigned to the data subset. Each bottom layer data manager is also operable to store the at least one key on a partition the data subset is assigned to. Each bottom layer data manager is further operable to provide an indication of whether the data value belongs to the data subset based on whether a key of the first set of keys assigned to the data value is stored on the partition. Each bottom layer data manager is further operable to obtain the data value of the data subset. Each bottom layer data manager is further operable to store the obtained data value on the partition. The multi-layer data storage system further includes an allocation manager operable to determine whether to readjust a storage space of at least one partition of the plurality of partitions. The allocation manager is further operable to dynamically readjust the at least one partition based on at least one of a frequency data values of the dataset are stored on the at least one partition and a storage capacity of the at least one partition.

In accordance with another illustrative embodiment a method for storing data is provided. The method includes receiving, over a network, a data value of a dataset having a plurality of data subsets, each subset having a plurality of data values sharing a common parameter. The method also includes determining, based on a parameter of the data value, a data subset of the plurality of data subsets sharing the parameter. The method further includes assigning a key of a key space to each data value of the dataset. The method further includes dividing the key space into a plurality of sets of keys. The method further includes dividing each set of keys into a plurality of subsets of the set of keys, wherein each subset of the set of keys is assigned to a data subset of the plurality of data subsets. The method further includes storing the received data value on a first partition of a plurality of partitions of a storage medium. The method further includes updating the first partition to indicate that the received data value is stored on the first partition. The method further includes determining whether to readjust a storage space of the first partition based on data values stored on the first partition.

In accordance with another illustrative embodiment, a machine-readable medium including instructions stored therein, which when executed by one or more processors, causes the one or more processors to perform operations to store data is provided. The instructions include instructions for receiving, over a network, a data value of a dataset having a plurality of data subsets, each subset having a plurality of data values sharing a common parameter. The instructions also include instructions for determining, based on a parameter of the data value, a subset of the plurality of subsets sharing the parameter. The instructions further include instructions for assigning a key of a key space to each data value of the dataset. The instructions further include instructions for dividing the key space into a plurality of sets of keys. The instructions further include instructions for dividing each set of keys into a plurality of subsets of the set of keys, wherein each subset of the set of keys is assigned to a data subset of the plurality of data subsets. The instructions further include instructions for storing the received data value on a first partition of a plurality of partitions of a storage medium. The instructions further include instructions for updating the first partition to indicate that the received data value is stored on the first partition. The instructions further include instructions for periodically determining whether to readjust a storage space of the first partition based on data values stored on the first partition.

Additional details of the disclosed embodiments are provided below in the detailed description and corresponding drawings.

DETAILED DESCRIPTION

Figure 1:
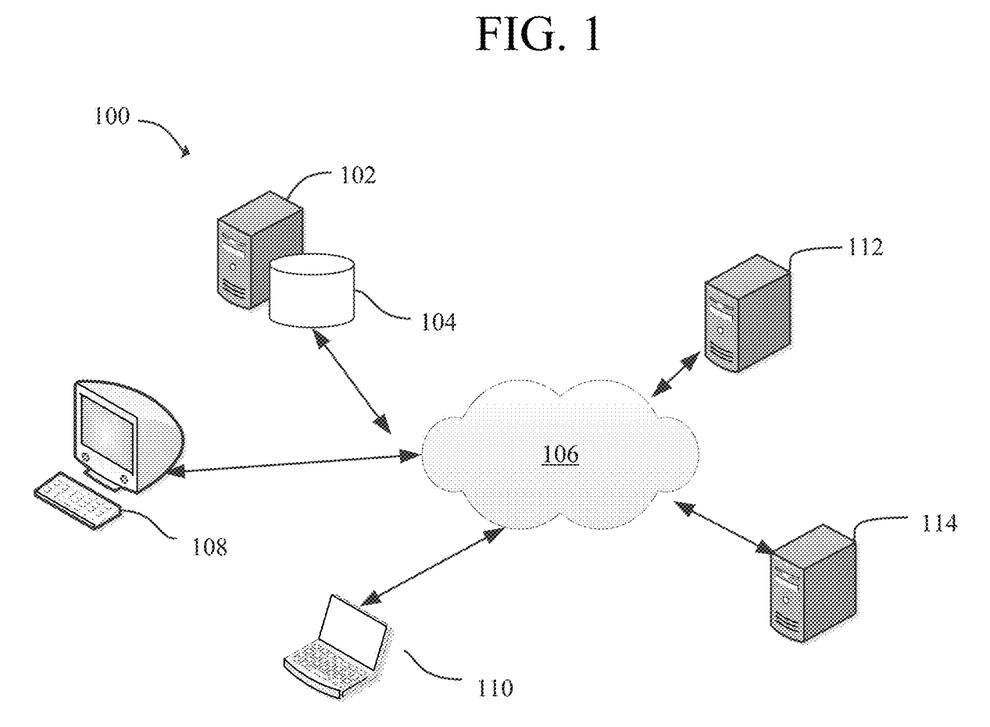
FIG. 1 is a network environment for storing data in accordance with one embodiment.

FIG. 1 is a network environment 100 for storing data in accordance with one embodiment. The network environment 100 includes a data storage system 102 communicatively connected to external data sources 108, 110, 112, and 114 via a network 106 and operable to receive data values from the external data sources 108, 110, 112, and 114 over the network 106.

The data storage system 102 includes one or more electronic devices or hardware/software component thereof, operable to receive data values from the data sources 108, 110, 112, and 114, store the received data values on a machine or computer readable medium (storage medium) 104, and dynamically readjust partitions of the storage medium 104 based on the received data values and/or a frequency of the received data values. Examples of electronic devices include server computers, desktop computers, laptop computers, tablet computers, smartphones, PDAs, and similar electronic devices.

The storage medium 104 may be formed from data storage components such as, but not limited to, ROM, RAM, flash memory, magnetic hard drives, solid state hard drives, CD-ROM drives, DVD drives, floppy disk drives, as well as other types of data storage components and devices. In some embodiments, the storage medium 104 includes multiple data storage devices. In further embodiments, the multiple data storage devices may be physically stored at different locations. The storage medium 104 includes a plurality of partitions for storing data values obtained from the external data sources 108, 110, 112, and 114. In some embodiments, the storage medium 104 of the data storage system 102 also includes instructions for operating the data storage system 102.

The data storage system 102 includes a system manager component (system manager), at least one data manager component (data manager), and an allocation manager component (allocation manager). The system manager receives data values transmitted by one or more of the external data sources 108, 110, 112, and 114. The data values belong to a dataset having multiple data subsets. The system manager assigns the data subsets to one or more partitions of the storage medium 104. Further, one or more data managers store the received data values on the one or more partitions of the storage medium 104. Additional descriptions of the system manager, the data manager, as well as how data values are assigned and stored on the storage medium 104 are provided in the subsequent paragraphs and are illustrated in FIGS. 2-7.

The allocation manager determines if the some of the partitions are saturated. As defined herein, a partition is "saturated" if the allocation manager may allocate additional storage space to the partition. In some embodiments, the partition is saturated if a first threshold percentage of the partition contains data values. In other embodiments, the partition is saturated if a first threshold number of data values are stored on the partition. In some embodiments, the allocation manager also predicts when the partition may become saturated based on a frequency of data values received by the data storage system 102 within an operational duration or based on a frequency of data values stored on the partition within the operational duration. In one of such embodiments, the partition may become saturated if the number of new data values stored on the partition within an operational duration exceeds a second numerical threshold. In another one of such embodiments, the partition may become saturated if the combined size of data values stored on the partition within the operational duration exceeds a first threshold size. In a further one of such embodiments, the partition may become saturated if a second threshold percentage of the partition is filled with new data values within the operational duration.

The allocation manager also determines if some of the partitions are under-utilized. As defined herein, a partition is "under-utilized" if the allocation manager may allocate some of the partition's unused storage space to another partition. In some embodiments, the partition is under-utilized if a third threshold percentage of the partition does not contain data values. In further embodiments, the partition is under-utilized if data values stored on the partition have a combined size that is less than a second threshold size.

In some embodiments, the allocation manager determines whether the partition is under-utilized, saturated, may become under-utilized, or may become saturated not only based on the number of data values stored on the partition or the frequency of data values stored on the partition, but also based on the number of data values stored on other partitions of the storage medium 104 as well as the frequency at which data values are stored on the other partitions of the storage medium 104. In one of such embodiments, the partition is saturated if the number of data values stored on the partition is a fourth threshold percentage greater than the average number of data values stored on the partitions of the storage medium 104. In another one of such embodiments, the partition is under-utilized if the number of data values stored on the partition is a fifth threshold percentage less than the average number of data values stored on the partitions of the storage medium 104. In such embodiments, the determination of whether the partition is saturated, under-utilized, may become saturated or may become under-utilized dynamically changes as different data values are received by the data storage system 102.

The allocation manager dynamically readjusts a saturated partition by allocating unused storage space from one or more under-utilized partitions to the saturated partitions. Additional descriptions of the allocation manager as well as other components of the data storage system 102 are provided in the following paragraphs and are illustrated in at least FIGS. 2-7.

The external data sources 108, 110, 112, and 114 include any hardware and/or software running on an electronic device operable to provide data values over the network 106 to the data storage system 102. Examples of electronic devices include server computers, desktop computers, laptop computers, tablet computers, smartphones, PDAs, and similar electronic devices.

The network 106 can include, for example, any one or more of a cellular network, a satellite network, a personal area network (PAN), a local area network (LAN), a wide area network (WAN), a broadband network (BBN), the Internet, and the like. Further, the network 106 can include, but is not limited to, any one or more of the following network topologies, including a bus network, a star network, a ring network, a mesh network, a star-bus network, tree or hierarchical network, or similar network architecture. In some embodiments, the network 106 includes a wired or wireless networking device (not shown) configured to facilitate communication between the data storage system 102 and the external data sources 108, 110, 112, and 114. Examples of the networking device include, but are not limited to, wired and wireless routers, wired and wireless modems, access points, as well as other types of suitable networking devices described herein. Although FIG. 1 illustrates a single data storage system 102 communicatively connected to the external data sources 108, 110, 112, and 114 via the network 106, additional data storage systems (not shown) and additional external sources (not shown) may also be communicatively connected to the data storage system 102 via the network 106 and operable to provide data values to the data storage system 102 via the network 106.

Figure 2:
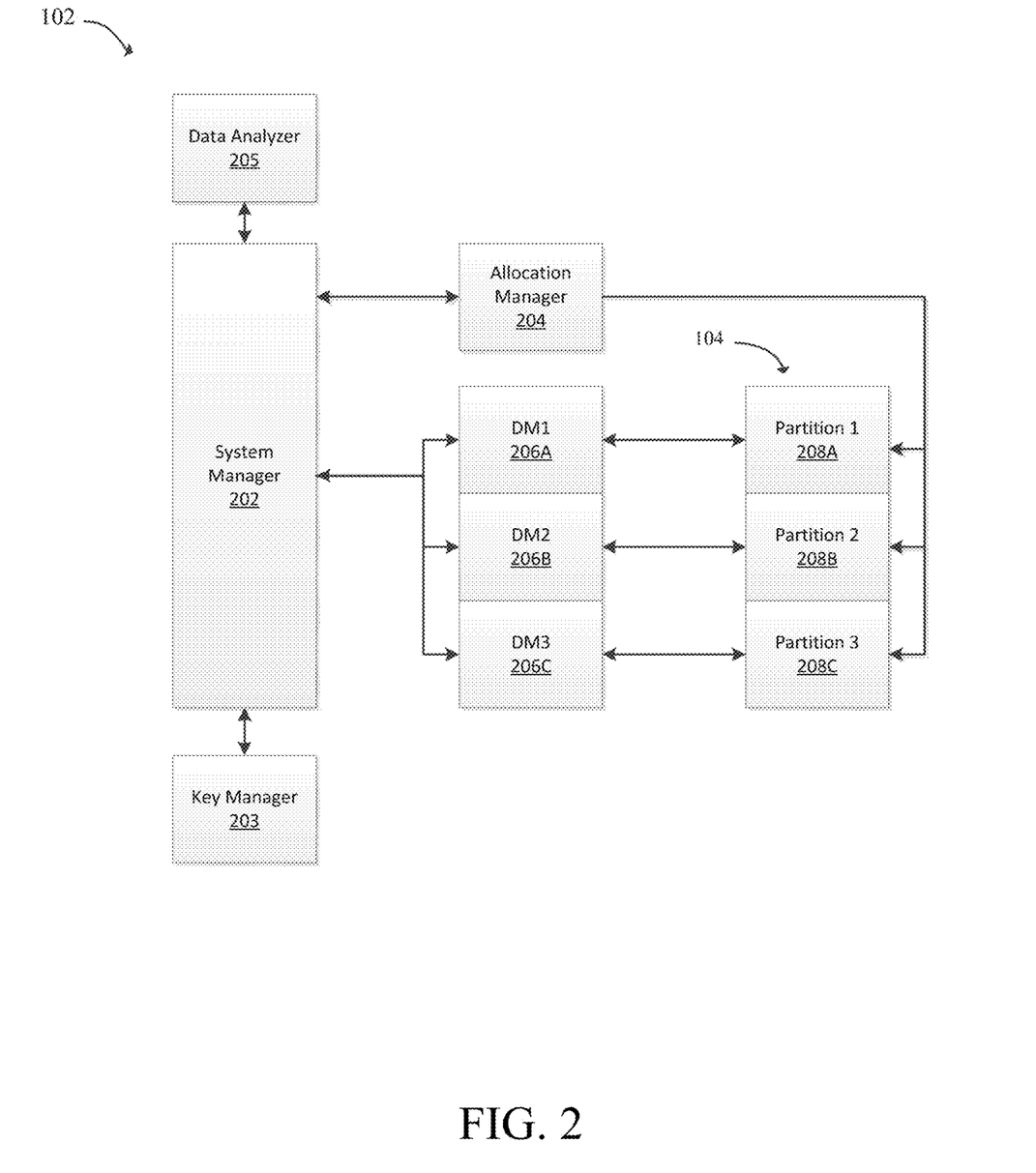
FIG. 2 is a schematic view of the data storage system of FIG. 1 in accordance with one embodiment.

FIG. 2 is a schematic view of the data storage system 102 of FIG. 1 in accordance with one embodiment. The data storage system 102 includes a system manager 202, a key manager 203, an allocation manager 204, first, second and third data managers 206A-206C, and first, second, and third partitions 208A-208C of the storage medium 104.

The system manager 202 receives data values of a dataset from the external sources 108, 110, 112, and 114. The dataset includes all possible data values of a collection of data. Examples of datasets include, but are not limited to all possible internet protocol addresses, credit card numbers, financial security transaction numbers, usernames having a finite storage space, existing telephone numbers, postal codes, or any other collections of data that may be transmitted over the network 106. The key manager 203 maps each data value of the dataset to a key on a key space, where each key may be used to identify a corresponding data value, determine whether the corresponding data value is stored on the storage medium 104, and identify the data manager managing the corresponding data value. For example, if a dataset contains sixteen different data values, the key manager 203 assigns 16 different keys of the keyset to the sixteen different data values of the dataset. Although FIG. 2 illustrates the system manager 202 and the key manager 203 as separate components, the key manager 203 may also form a subcomponent of the system manager 202.

The dataset is divided into multiple data subsets based on parameters of the data values of the dataset. For example, a dataset of internet protocol addresses may be divided into subsets containing government based internet protocol addresses, private network internet addresses, multicast internet protocol addresses, or other categories of internet protocol addresses based on the attributes of the internet protocol addresses. Further, a dataset of usernames may be divided into data subsets containing usernames beginning with a letter, usernames beginning with a number, and usernames beginning with a special character. In some embodiments, the system manager 202 provides the received data values to a data analyzer 205 to determine, based on at least one parameter of the data value, a data subset that shares the at least one parameter. Examples of data analyzers 205 include, but are not limited to deep belief networks, auto encoders, packet sniffers, or similar components operable to analyze data values to determine characteristics or parameters of the data values. Additional descriptions of the data analyzer 205 are provided in the subsequent paragraphs. In some embodiments, the data analyzer 205 forms a subcomponent of the system manager 202. In other embodiments, the data analyzer 205 and the system manager 202 are separate components of the data storage system 102.

The data analyzer 205 divides the dataset into a first data subset, a second data subset, and a third data subset. Moreover, the system manager 202 assigns each of the first data manager 206A, the second data manager 206B, and the third data manager 206C to manage the first data subset, the second data subset, and the third data subset, respectively, and assigns the first data subset, the second data subset, and the third data subset to the first partition 208A, the second partition 208B, and the third partition 208C of the storage medium 104, respectively.

The first data manager 206A is operable to store data values of the first data subset and keys assigned to the data values of the first data subset on the first partition 208A. Similarly, the second and third data managers 206B and 206C are operable to store data values of the second and third data subsets and keys assigned to the data values of the second data subset and the third data subset on the second and third partitions 208B and 208C, respectively. In other embodiments, the dataset includes a different number of data subsets, where each dataset is managed by a data manager and is assigned to a partition of the storage medium 104.

Each of the first, second, and third data managers 206A-206C may determine whether a data value received by the system manager 202 belongs to a data subset managed by the respective data manager 206A, 206B, or 206C. In some embodiments, each of the first, second, and third data managers 206A-206C calculates a probability that a key assigned to the data value is stored on the first, second, or third partition 208A, 208B, or 208C, respectively. Further, each of the first, second, and third data managers 206A-206C also provides an indication of whether the data value is managed by the respective data manager 206A, 206B, or 206C. In one of such embodiments, each of the first, second, and third data managers 206A-206C then provides an indication of the calculated probability that a key assigned to the data value is stored on the first, second, or third partition 208A, 208B, or 208C, respectively. In another one of such embodiments, each of the first, second, and third data managers 206A-206C transmits an indication that the data value belongs to or does not belong to the data subset managed by the respective data manager 206A, 206B, or 206C. In other embodiments, the foregoing process is periodically performed by one or more of the first, second, and third data managers 206A, 206B, or 206C.

Over time, the data storage system 102 may receive more data values belonging to one data subset of the dataset relative to other data subsets of the dataset. As such, partitions 208A-208C may store uneven amounts of data values, and one of the partitions 208A, 208B, or 208C may become saturated, while another one of the partitions 208A, 208B, or 208C may become under-utilized. The allocation manager 204 determines whether to readjust the storage space of the partitions 208A-208C to make better use of available storage space of one or more under-utilized partitions of the storage medium 104 by providing the available storage space to one or more saturated partitions of the storage medium 104.

The allocation manager 204 then dynamically readjusts the partitions 208A-208C to provide unused storage space of an under-utilized partition to a saturated partition. In some embodiments, the allocation manager 204 periodically determines how frequently data values of the dataset are stored on the partitions 208A-208C. In one of such embodiments, the allocation manager 204 determines the frequencies at which data values are stored on the first, second, and third partitions 208A-208C, respectively. As stated herein, the allocation manager 204 may predict when the partitions 208A-208C will become saturated based on frequencies at which data values are stored on the respective partitions 208A-208C within an operational duration. In one example embodiment, the allocation manager 204 increases the storage space of a partition 208A, 208B, or 208C if the allocation manager 204 predicts that the respective partition 208A, 208B, or 208C will become saturated within a first threshold operational duration. Alternatively, the allocation manager 204 decreases the storage space of a partition 208A, 208B, or 208C if the allocation manager 204 predicts that the respective partition 208A, 208B, or 208C will not become saturated within a second threshold operational duration. In another one of such embodiments, the allocation manager 204 predicts whether to increase or decrease the storage space of a partition 208A, 208B, or 208C based on frequencies at which data values are stored on other partitions of the storage medium 104. According to one example, the first partition 208A and the second partition 208B each has storage space to store 100 data values and each currently stores 50 data values. Further, 10 data values have been added to the first partition 208A within the last hour, whereas no data value has been added to the second partition 208B has within the last week. The allocation manager 204 may determine that at the foregoing frequencies, the first partition 208A may be completely filled with data values in 5 hours, whereas the second partition 208B may not become saturated in the near future. As such, the allocation manager 204 increases the storage space of the first partition 208A by allocating some of the unused storage space of the second partition 208B. Additional descriptions of the allocation manager 204 are provided in the subsequent paragraphs.

Figure 3:
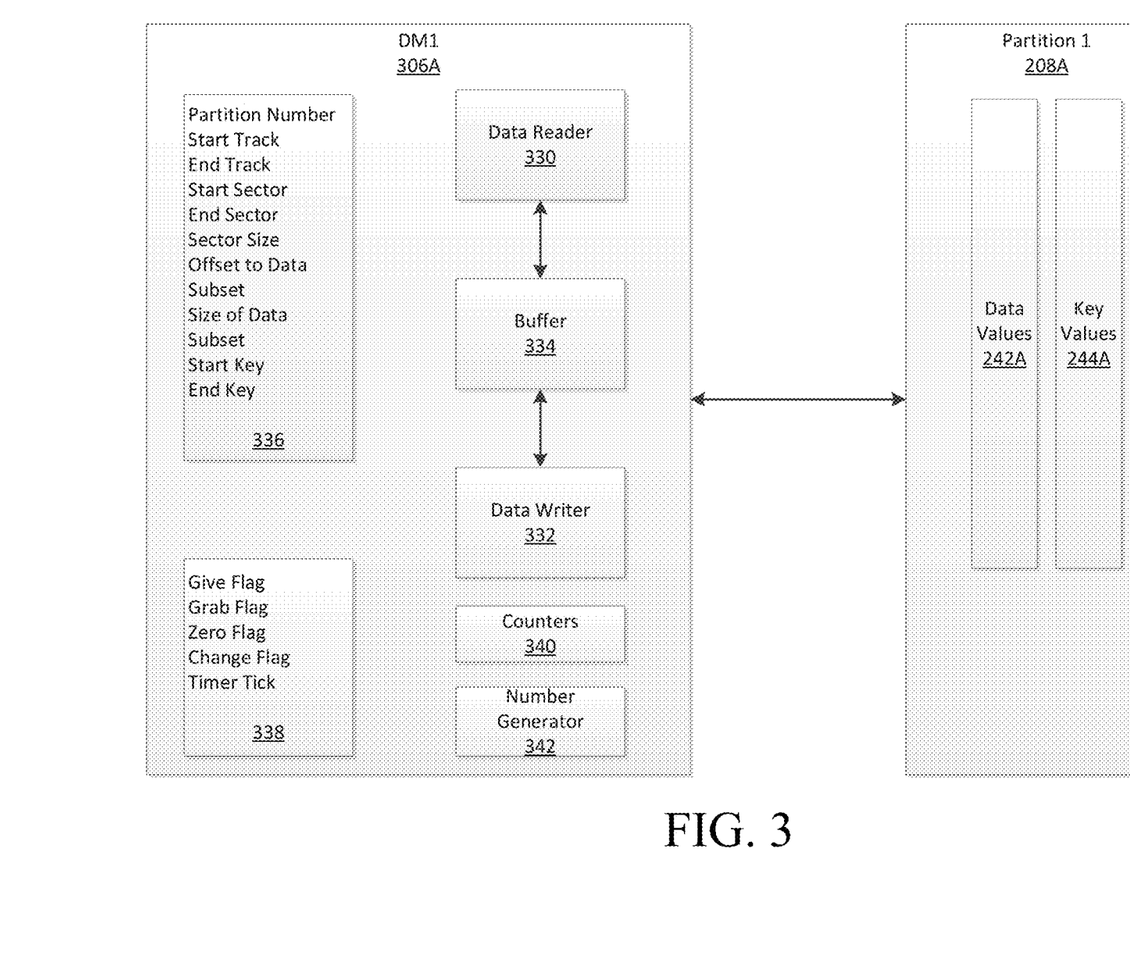
FIG. 3 is a schematic view of a data manager and a partition of a storage medium component of the data storage system in accordance with one embodiment.

FIG. 3 is a schematic view of a data manager 306A and a first partition 208A of the storage medium 104 of the data storage system 102 in accordance with one embodiment. The data storage system 102 initially assigns the data manager 306A to manage a data subset of the dataset and to store data values of the data subset on the first partition 208A of the storage medium 104. The data manager 306A includes a set of operational values 336 containing information and instructions on where to store data values belonging to the data subset managed by the data manager 306A. In the example of FIG. 3, the set of operational values 336 includes a partition number of the first partition 208A, start and end track values of the first partition 208A, and start and end sector values of the first partition 208A. The set of operational values 336 also includes values indicative of a total storage space of the first partition 208A, a size of unused space on the first partition 208A, an offset of the first partition 208A relative to other adjacent partitions, locations of data values stored on the first partition 208A, a total number of data values stored on the partition, and offset(s) of one or more data values stored on the first partition 208A. The set of the operational values 336 further includes values indicative of a first key (start key) of the set of keys assigned to the data subset, a last key (end key) of the set of keys assigned to the data subset, a total number of keys assigned to the data subset, locations of the keys assigned to the data subset, as well as other operational values.

The data manager 306A also includes a set of indicators 338 (flags, timer ticks, counters, as well as other types of indicators that identify a status of the data values stored on the first partition 208A) that identify whether the storage space of the first partition 208A should be readjusted. In the example of FIG. 3, the set of indicators 338 includes a grab flag indicative of a request to increase the storage space of the first partition 208A and a give flag indicative of a request to decrease the storage space of the first partition 208A. A clear zero flag indicates that at least one data value belonging to the data subset managed by the data manager 306A is stored on the first partition 208A, whereas a set zero flag indicates that no data value belonging to the data subsect managed by the data manager 306A is stored on the first partition 208A. A set change flag indicates that a data value belonging to the data subset has been modified since the last time the data manager 206A accessed the first partition 208A. In some embodiments, the allocation manager 204 periodically queries the data manager 306A to obtain the status of one or more flags. For example, the allocation manager 204 may periodically query the data manager 306A to determine if the zero flag is set. If the allocation manager 204 determines that the zero flag has been consistently set after a threshold number of queries, the allocation manager 204 may determine that the partition 208 is under-utilized and that a portion of the storage space of the first partition 208A should be allocated to another partition of the storage medium 104. In other embodiments, the data manager 306A provides the status of one or more flags to the allocation manager 204 in response to a status update of the one or more flags. For example, the data manager 306A provides a status update to the allocation manager 204 whenever the status of the give flag or the take flag changes from clear to set. The allocation manager 204 then allocates additional storage space to the first partition 208A upon receipt of a set take flag. Alternatively, the allocation manager 204 allocates a portion of unused storage space of the first partition 208A to another partition upon receipt of a set give flag from the data manager 306A.

A timer tick represents a value of a number generated by a number generator 342. In some embodiments, the number generator 342 generates a numerical value within a range of numerical values, where the range is constant among each number generator used to determine whether to adjust the storage space of the partitions of the storage medium 104. Further, the value is indicative of whether the storage space of the first partition 208A should be readjusted and a priority level for readjusting the storage space of the first partition 208A. In one of such embodiments, the number generator 342 generates numerical values between −100 and 100, where a numerical value of 0 represents that the storage space of the first partition 208A is not saturated or under-utilized. Moreover, a positive numerical value represents that the first partition 208A is saturated and that additional storage space should be allocated to the first partition 208A. Further, a negative numerical value represents that the first partition 208A is under-utilized and that unused storage space of the first partition 208A should be allocated to other partitions of the storage medium 104. The data manager 306A along with other data managers of the data storage system 102 periodically provide the timer tick to the allocation manager 204. When the allocation manager 204 receives multiple timer ticks from multiple data managers, the allocation manager 204 assigns a higher priority to increase the storage space of the first partition if the numerical value of the timer tick is greater than the numerical values of the other partitions. Similarly, the allocation manager 204 assigns a higher priority to decrease the storage space of the first partition 208A if the numerical value of the timer tick is negative and is less than the numerical values of other partitions.

In other embodiments, the number generator 342 generates a numerical value indicative of the probability that the received data value is stored on the first partition 208A. The data manager 306A sets the timer tick to the generated numerical value, and provides the timer tick to the system manager 202. In some embodiments, a copy of the operational values 336 and the set of indicators 338 are also stored on the first partition 208A. In further embodiments, the operational values 336 and the set of indicators 338 may be accessed by the allocation manager 204.

In some embodiments, when the system manager 202 receives a data value, the data manager 306A accesses the operational values 336 then accesses the first section 242A of the first partition 208A based on the operational values 336 to determine whether the received data value is stored on the first partition 208A. The data manager 306A also accesses the second section 244A based on the operational values 336 to determine a key for the data value. The data manager 306A then generates one or more indications that the received data value is assigned to a data subset managed by the data manager 306A and that the received data value is stored on the first partition 208A.

The data manager 306A also includes a set of counters 340. The set of counters 340 includes a first counter that counts the total number of data values belonging to the data subset managed by the data manager 306A that are stored on the first partition 208A. The value of the first counter may be increased or decreased when new data values belonging to the data subset are added to the first partition 208A or when existing data values belonging to the data subset are deleted from the first partition 208A, respectively. In some embodiments, the set of counters 340 also includes a second counter that counts the number of times (frequency) that new data values are stored on the first partition 208A within a threshold operational duration. In some embodiments, the set of counters 340 also includes a third counter that counts the number of times data values have been deleted from the first partition 208A within the threshold operational duration. In some embodiments, the set of counters 340 also includes a fourth counter that counts the number of times data values belonging to the data subset managed by the data manager 306A have been modified. The value of the fourth counter is increased after a data value is stored on the first partition 208A or if an existing value is modified. In further embodiments, the data manager 306A increases the number of counters of the set of counters 340 if the obtained data value or if the new value for the obtained data value is stored on the first partition 208A and decreases the number of counters of the set of counters 340 if a data value is deleted from the first partition 208A.

In some embodiments, the data manager 306A provides the values of the set of counters 340 to the allocation manager 204. In other embodiments, the data manager 306A queries the values of the set of counters 340. The allocation manager 204 may determine whether the first partition 208A is saturated or is under-utilized based on the counter values indicative of the total number of data values stored on the first partition 208A. The allocation manager 204 may also predict when the first partition 208A may become saturated or become under-utilized based on the counter values indicative of the number of times new data values have been added to the first partition 208A or deleted from the first partition 208A within the threshold operational duration.

In some embodiments, the data storage system 102 also includes a map generator (not shown) that generates a density map of the data values based on the counter values of the data manager 306A as well as other data managers of the data storage system 102. In further embodiments, the map generator generates a density map of the data values based on the number of counters of the data manager 306A as well as the number of counters of the other data managers of the data storage system 102. In one of such embodiments, the density map illustrates a distribution of the data values stored on the partitions of the storage medium 104. In another one of such embodiments, the density map illustrates a frequency of the data values received by the data storage system 102.

The data manager 306A also includes a buffer 334, where the buffer 334 is a storage medium for storing data values before the data values are stored on the first partition 208A. In some embodiments, the buffer 334 is a temporary storage medium that is dynamically allocated to hold data values during read/write operations described in the following paragraphs. In other embodiments, the buffer 334 is a persistent component of the data manager 306A. In further embodiments, the buffer 334 is an independent component of the data storage system 102 and is shared by multiple data managers. In one of such embodiments, each of the multiple data managers stores data values in the buffer 334 while performing read and write operations described following paragraphs.

The data manager 306A operates the data reader 330 and the data writer 332 to transfer (read/write) data values from the first partition 208A to the buffer 334 and from the buffer 334 to the first partition 208A, respectively. In some embodiments, the data manager 306A determines whether a received data value stored on the buffer 334 is stored on the first partition 208A. The data manager 306A then operates the data writer 332 to write the received data value from the buffer 334 to the first partition 208A if the data value is not stored on the first partition 208A. In further embodiments, the data manager 306A checks if the change flag is set to determine if a data value stored on the first partition 208A has been modified by the data value received by the data manager 306A. If the change flag for a data value stored on the first partition 208A is set, then the data manager 306A operates the data reader 330 to read the stored data value onto the buffer 334. The data manager 306A then compares the stored data value with the received data value and operates the data writer 332 to write the received data value onto the first partition 208A to replace the stored data value. In further embodiments, the data manager 306A operates the data reader 330 to read the data value from the first partition 208A onto the buffer 334 and operates the data writer 332 to write the data value to another partition (not shown) of the storage medium 104.

The data manager 306A may add a new data value to the data subset managed by the data manager 306A. In some embodiments, the data manager 306A obtains the new data value based on a key assigned to the new data value, loads the new data value onto the buffer 334, and writes the new data value at a location on the first partition 208A based on the operational values 336. In one of such embodiments, the data manager 306A then sets the zero flag to indicate that the new data value is stored on the first partition 208A and sets the change flag to indicate that the original dataset has been modified.

The data manager 306A may also delete an existing data value from the data subset managed by the data manager 306A. In some embodiments, the data manager 306A assesses the set of indicators to determine if the zero flag is set. If the zero flag is set, then no data value belonging to the data subset managed by the data manager 306A is stored on the first partition 208A and the data manager 306A returns an indication that the delete operation is not performed since there is no data value to delete from the first partition 208A. In one of such embodiments, where the zero flag is not set, the data manager 306A operates the data reader 330 to load all data values belonging to the data subset onto the buffer 334, deletes the existing data value, and sets the change flag to indicate that at least one data value belonging to the data subset managed by the data manager 306A has been modified. The data manager 306A also sets the zero flag if no additional data value belonging to the data subset is stored on the first partition after deletion of the existing data value. The data manager 306A then writes the data values to the first partition 208A.

In some embodiments, the data manager 306A may also rearrange data values of the data subset that are stored on the first partition 208A. In some embodiments, the data manager 306A accesses the operational values 336 to determine if there are offsets between data values stored on the first partition 208A. In one embodiment, if there are offsets between the data values, the data manager 208A determines if the offset data values may be moved to a new location on the first partition to eliminate the offset. If so, then the data manager 306A moves the offset data values to the new location. The data manager 306A then updates the operational values 336 to include the new addresses of the data values.

Figure 4:
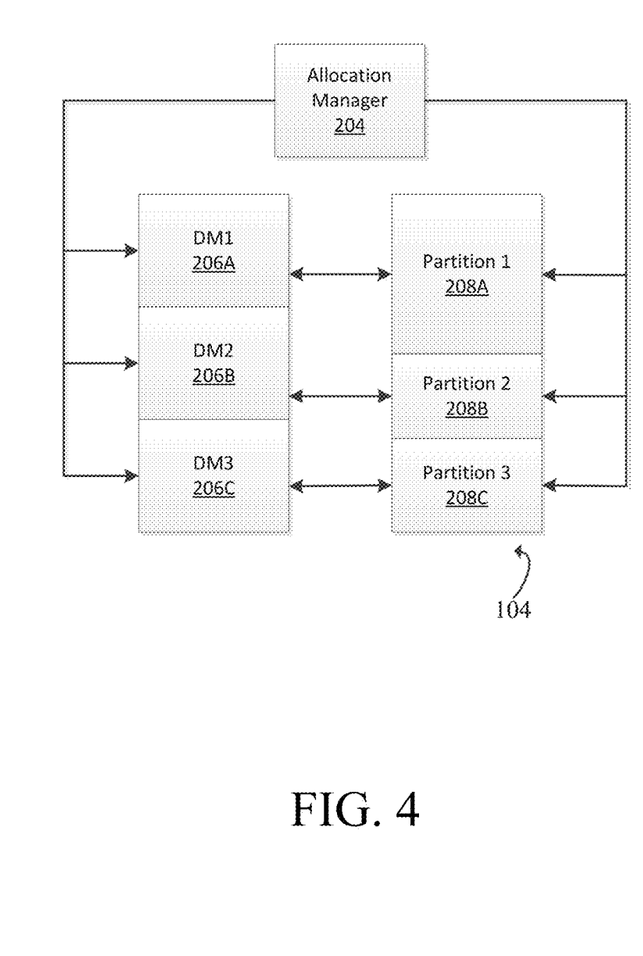
FIG. 4 is a schematic view of an allocation manager of FIG. 2 assigned to three data managers and three partitions in accordance with one embodiment.

FIG. 4 is a schematic view of the allocation manager 204 of FIG. 2 assigned to the first, second, and third data managers 206A-206C and to the first, second, and third partitions 208A-208C of the storage medium 104 in accordance with one embodiment. Each data manager of the first, second, and third data managers 206A-206C is operable to perform various operations described herein to obtain, to store, and to modify data values and key values.

As stated herein, the allocation manager 204 may periodically query the first, second and third data managers 206A-206C to determine the storage space of each of the first, second, and third partitions 208A-208C, and to determine whether to adjust the storage space of the first, second, and/or third partitions 208A-208C. In some embodiments, the allocation manager 204 accesses the operational values and indicators of one or more data managers 206A-206C to determine the storage space of the first, second, and third partitions 208A-208C, location of the first, second, and third partitions, and offset information. The allocation manager 204 also accesses operational values, indicators, and counters discussed herein to determine whether to increase or decrease the storage space of the of the partitions 208A-208C. In one of such embodiments, the allocation manager 204 accesses the indicators of each data manager 206A-206C to determine whether the give flag or grab flag of the respective data manager are set. In one example, if the grab flag of the first data manager 206A is set and the give flags of the second and the third data managers 206B and 206C are set, then unused storage space should be reallocated from the second and third partitions 208B and 208C, which store data subsets managed by the second and third data managers 206B and 206C, to the first partition 208A, which stores the data subset managed by the first data manager 206A. If the allocation manager 204 determines that multiple data managers have grab or give flags set, then the allocation manager 204 retrieves one or more timer ticks from each data manager 206A-206C. In one of such embodiments, the allocation manager 206A prioritizes the allocation process based the timer tick values of the first, second, and third data managers 206A-206C. As such, if the allocation manager 204 determines that the first data manager 206A and another data manager (not shown) both have grab flags set, and the data manager 206A has a higher timer tick value relative to the other data manager, then the allocation manager 204 priorities increasing the storage space of the first partition 208A. Alternatively, if the allocation manager 204 determines that the second data manager 206B and the third data manager 206C both have give flags set, and the absolute value of the timer tick of the second data manager 206B is less than the absolute value of the timer tick of the third data manager 206C, then the allocation manager 204 priorities decreasing the storage space of the third partition 208C.

In another one of such embodiments, the allocation manager 204 accesses the counter values of the first, second, and third data managers 206A-206C to determine the total number of data values stored on each of the first, second, and third partitions 208A-208C. In a further one of such embodiments, the allocation manager 204 accesses the counter values of the first, second, and third data managers 206A-206C to determine the number of times (frequency) new data values have been added to each of the first, second, and third partitions 208A-208C, or the number of times existing data values have been modified or deleted from each of the first, second, and third partitions 208A-208C. The allocation manager 204 then prioritizes the allocation process based on the counter values of the first, second, and third data managers 206A-206C.

In some embodiments, the allocation manager 204 prioritizes the allocation process based on counter values indicative of the current number of data values stored on the first, second, and third partitions 208A-208C as well as well as counter values indicative of a predicted number of data values stored on the first, second, and third partitions 208A-208C to prioritize the allocation process. In one example embodiment, each of the first, second, and third partitions 208A-208C has storage space to store 100 data values and the allocation manager 204 determines from the counter values that the first partition 208A currently stores 90 data values, the second partition 208B currently stores 50 data values, and the third partition 208C currently stores 10 data values. In such embodiment, the allocation manager 204 may determine that the first partition 208A is saturated and that the third partition 208C is under-utilized. The allocation manager 204 then allocates unused storage space from the third partition 208C to the first partition 208A. However, if the allocation manager 204 also determines from the counter values that no new data value has been added to the first partition 208A within the last year, 10 data values have been removed from the second partition 208B within the last week, and that all 10 of the data values currently stored on the third partition 208C have been added within the last minute, then the allocation manager 204 may predict that the third partition may become saturated within the next 9 minutes and allocate unused storage space from the second partition 208B to the third partition 208C.

The allocation manager is also operable to assign multiple data managers to store data values of data subsets belonging to the data managers on a single partition. In one example, if after an operational duration, the storage medium 104 does not contain any data value belonging to a subset managed by the second data manager 206B or the third data manager 206C, then the data storage system 102 may determine that the data storage system 102 is unlikely to receive data values belonging to the data subsets managed by the second data manager 206B and the third data manager 206C, respectively. As such, the allocation manager 204 re-assigns the second data manager 206B to the third partition 208C. The allocation manager 204 may also reallocate some or all of the storage space of the second partition 208B to another partition of the storage medium 104.

Similarly, the allocation manager 204 may also reallocate key values stored on one partition to a different partition of the storage medium 104. The second partition 208B of the foregoing example, stores a set of key values assigned to each data value of the data subset managed by the second data manager 206B. Once the allocation manager 204 determines to reassign the second data manager 206B to the third partition 208C, the allocation manager 204 may also store the key values of the data subset managed by the second data manager 206B on the third partition 208C. In further embodiments, the allocation manager 204 reallocates all of the data values and key values initially stored on the second partition 208B to the third partition 208C. In further embodiments, the allocation manager 204 combines the second and the third partitions 208B and 208C to form a new partition (not shown) and stores data values and keys previously stored on the second and the third partitions 208B and 208C on the new partition.

Figure 5A:
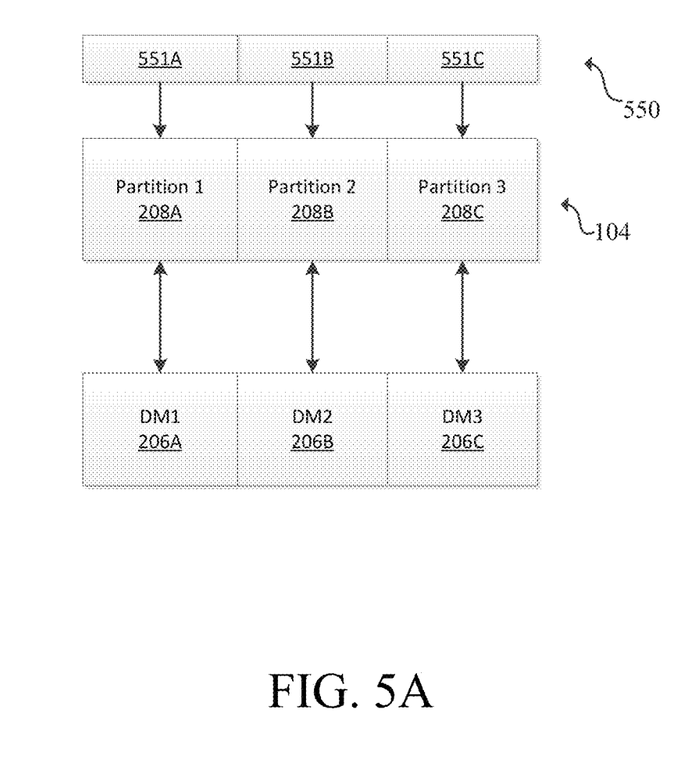
FIG. 5A is a schematic view of an initial state of the partitions of FIG. 4 and a key space containing three sets of keys mapped to data values stored on the partitions in accordance with one embodiment.

FIG. 5A is a schematic view of an initial state of the first, second, and third partitions 208A-208C, and the first, second, and third data managers 206A-206C of FIG. 4, and a key space 550 containing three sets of keys 551A-551C mapped to data values stored on the first, second, and third partitions 208A-208C in accordance with one embodiment. The data storage system 102 initially divides a dataset into a first, a second, and a third data subset, and assigns the first, the second, and the third data manager 206A-206C to manage the first, the second, and the third data subset, respectively. The data storage system 102 also divides the storage medium 104 approximately evenly into first, second, and third partitions 208A-208C for storing data values belonging to the three data subsets. A key manager (not shown) of the data storage system 102 divides the key space 550 approximately evenly into a first set of keys 551A, a second set of keys 551B, and a third set of keys 551C, and assigns the first, second and third sets of keys 551A-551C to the first, second, and third data subset, respectively.

Figure 5B:
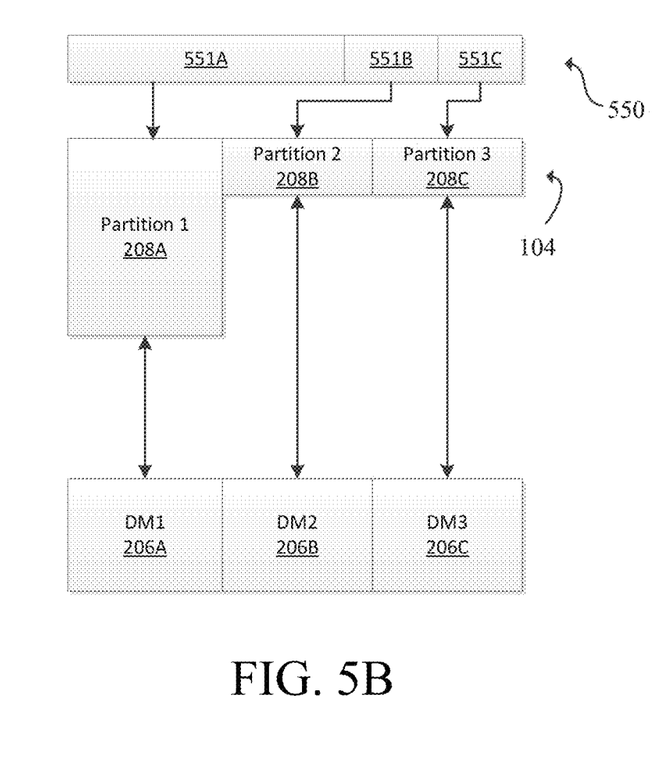
FIG. 5B is a schematic view of the partitions and key space of FIG. 5A at time T after the initial state in accordance with one embodiment.

Over time, the data storage system 102 receives more data values belonging to the first data subset relative to the second and the third data subsets, thereby causing the first partition 208A to become saturated and causing the second and third partitions 208B and 208C to become underutilized. FIG. 5B is a schematic view of the partitions, 208A-208C, data managers 206A-206C, and key space of FIG. 5A at time T after the initial state in accordance with one embodiment. The allocation manager 204 performs the operations described herein to allocate unused storage space from the second and third partitions 208B and 208C to the first partition 208A. As such, after time T, the storage space of the first partition 208A has been increased to store additional data values belonging to the first data subset, and the storage spaces of the second and the third partitions 208B and 208C have been correspondingly decreased since few data values belonging to the second or the third data subsets have been stored on the second or the third partition 208B or 208C.

In some embodiments, the allocation manager 204 operates a key manager (not shown) described herein to remap the key space 550 to increase the number of keys of the first set of keys and to decrease the number of keys in the second and third sets of keys. As illustrated in FIG. 5B, a number of keys initially assigned to data values belonging to the second or third data subset have been remapped and reassigned to data values belonging to the first data subset. As the data storage system 102 continues to operate, the allocation manager 204 and key manager continues to dynamically readjust the storage space of the partitions and remap the key space to data values stored on the partitions of the storage medium 104.

Figure 6:
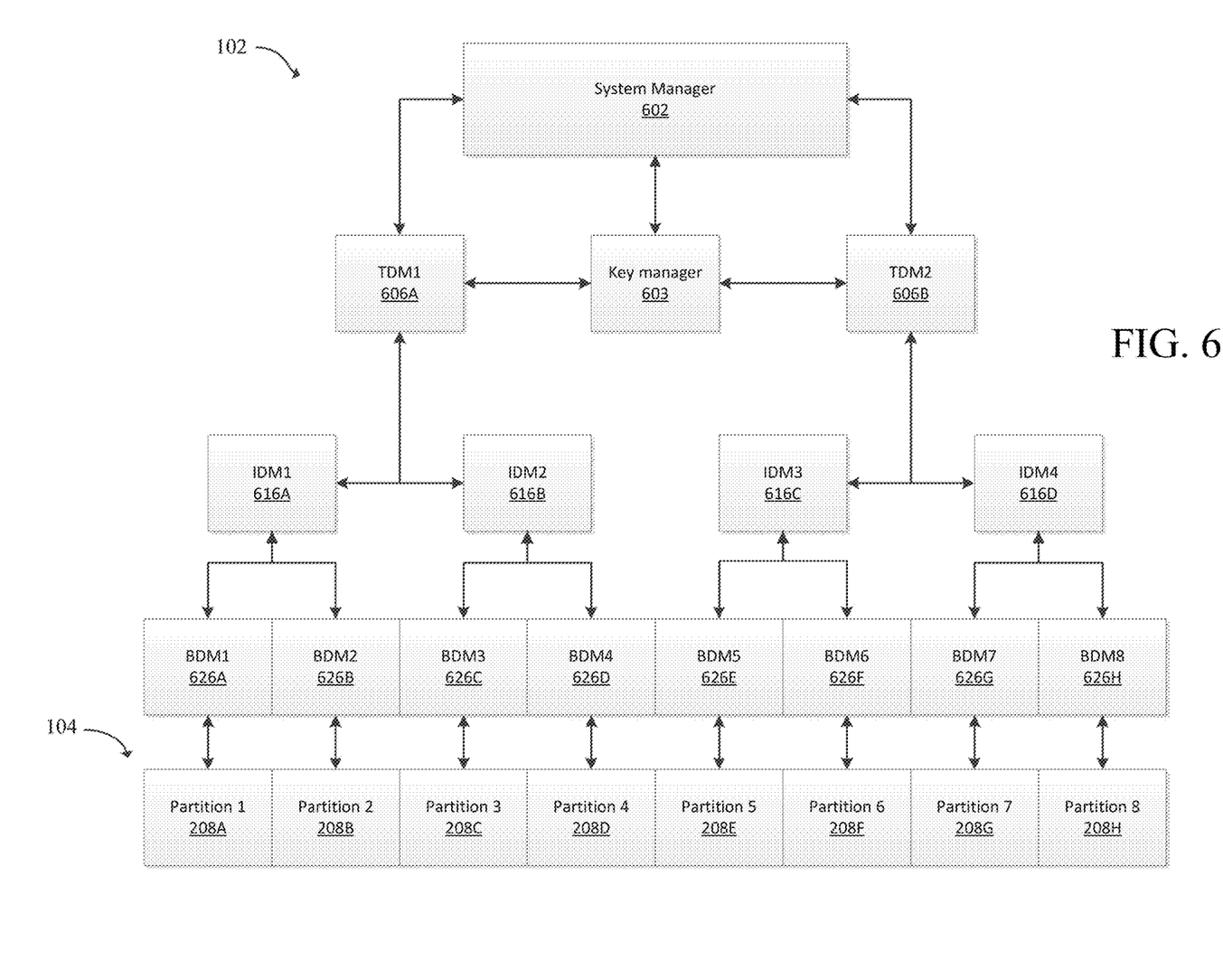
FIG. 6 is a schematic view of the data storage system of FIG. 1 having multiple layers of data managers in accordance with one embodiment.

The data storage system 102 may receive data values belonging to extremely large datasets (big data) or data values having multiple parameters. The data storage system 102 may also be implemented to facilitate storage of data values belonging to such datasets. FIG. 6 is a schematic view of the data storage system 102 of FIG. 1 having multiple layers (multi-layer data storage system) in accordance with one embodiment. The data storage system 102 includes a system manager 602, a storage medium 104 having eight partitions 208A-208H, a key manager 603, top layer data managers 606A and 606B, intermediate layer data managers 616A-616D, and bottom layer data managers 626A-626H. As defined herein, "top," "intermediary," "bottom," "higher," and "lower" refer to data transfer hierarchies. The terms "top," "intermediary," and "bottom" do not refer to an orientation of the data managers of the data storage system 102. Further, data values are transferred from the system manager 602 "down" to a top layer data manager, from the top layer data manager "down" to an intermediary layer data manager, and from the intermediary layer data manager "down" to a bottom layer data manager. Data values are transferred from the bottom layer data manager "up" to the intermediary layer data manager, from the intermediary layer data manager "up" to the top layer data manager, and from the top layer data manager "top" to the system manager 602. Data values are transferred from a "lower" layered data manager "up" to a "higher" layered data manager and are transferred from the "higher" layered data manager "down" to the "lower" layered data manager.

In some embodiments, each layer of the data storage system 102 subdivides a dataset and key values assigned to the dataset into smaller portions that may be easier managed by a data manager. In one example embodiment, if a dataset contains every financial transaction within the last two years, then each of the top layer data managers 606A and 606B is assigned to handle data values and key values belonging to transactions that occurred within one of the two years. Further, each of the intermediary data managers 616A-616D is assigned to handle transactions that occurred within a half year of the two years. Further, each of the bottom layer data managers 626A-626H is assigned to handle transactions that occurred within a quarter of the two years. Additional intermediary layers (not shown) may be utilized to further subdivide the financial transactions to transactions that occurred within a month, a week, a day, or a different duration of time. The system manager 602, similar to the system manager 202 of FIG. 2, receives data values from the external sources 108, 110, 112, and 114 and assigns each received data value to a data subset of the dataset. The key manager 603 maps each data value of the dataset to a key on a key space, and assigns a key of the key space to each data value of the dataset. The key manager 603 also divides the key space into multiple sets of keys and assigns the sets of keys to the top layer data managers 606A and 606B. The key manager 603 divides the key space into two sets of keys and assigns a first set of keys to a first top layer data manager 606A and a second set of keys to a second top layer data manager 606B. In other embodiments, the key manager 603 may divide the key space into a different number of sets of keys and may assign the sets of keys to a different number of top layer data managers. In further embodiments, the key manager 603 may assign multiple sets of keys of the key space to a single top layer data manager. In some embodiments, the key manager 603 is a subcomponent of the system manager 602.

The top layer data managers 606A and 606B, upon receipt of the first set of keys and the second set of keys, respectively, further divides the set of keys. More particularly, the first top layer data manager 606A divides the first set of keys into a first subset of keys and a second subset of keys, and provides the first subset of keys and the second subset of keys to a first intermediary layer data manager 616A and a second intermediary layer data manager 616B, respectively. Similarly, the second top layer data manager 606B divides the second set of keys into a third subset of keys and a fourth subset of keys and provides the third subset of keys and the fourth subset of keys to a third intermediary layer data manager 616C and a fourth intermediary layer data manager 616D, respectively.

The intermediary layer data managers 616A-616D further divide the four subsets of keys into eight subsets of subsets of keys and provide the eight subsets of subsets of keys to bottom layer data managers 626A-626H. In the foregoing financial transactions example, each set of keys received by a top layer data manager 606A or 606B contains keys assigned to data values corresponding to financial transactions that occurred within one year of the two years. Further, each subset of keys received by an intermediary layer data manager 616A, 616B, 616C or 616D contains keys is assigned to data values corresponding to financial transactions that occurred within a half year of the two years. Further, each subset of the subset of keys received by a bottom layer data manager 626A, 626B, 626C, 616D, 626E, 626F, 626G, or 626H is assigned to data values corresponding to financial transactions that occurred within a quarter of the two years. Although FIG. 6 illustrates one intermediary layer of data managers, the data storage system 102 may include multiple layers of data managers. In such embodiments, each intermediary layer data manager receives a subset of keys from a higher layer data manager, divides the received subset of keys into subsets of the subset of keys, and provides the subsets of the subset of keys to one or more lower layer data managers. In further embodiments, the data storage system 102 only includes top layer data managers 606A and 606B, and bottom layer data managers 626A-626H. In such embodiments, each top layer data manager 606A and 606B provides subsets of keys directly to one or more bottom layer data managers 626A-626H.

Each bottom layer data manager 626A-626H is assigned a data subset of the dataset. Further, each bottom layer data manager 626A-626H also obtains a subset of keys (subset of subset of keys, subset of subset of subset of keys, and additional subsets of subset of the keys.) of the key space assigned to the data subset. Each bottom layer data manager 626A-626H is operable to store a data value of the data subset assigned to the respective bottom layer data manager and corresponding keys on a partition 208A-208H of the storage medium 104 assigned to store data values belonging to the respective data subset.

Similar to the first, second, third, and fourth data managers 206A-206D of FIG. 2, each of the bottom layer data managers 626A-626H is operable to determine whether a data value received by the system manager 202 belongs to a subset managed by the respective bottom layer data manager 626A, 626B, 626C, 626D, 626E, 626F, 626G, or 626H. In some embodiments, each of the bottom layer data managers 626A-626H calculates a probability that the data value belongs to a data subset managed by the respective data manager 626A, 626B, 626C, 626D, 626E, 626F, 626G, or 626H.

In some embodiments, data values and instructions are transmitted from the system manager 602 down each layer of data managers until the data values or the instructions are transmitted to one or more bottom layer data managers 626A-626H and vice versa. For example, each of the bottom layer data managers 626A-626H provides the calculated probability to a data manager one layer higher than the respective bottom layer data manager. In some embodiments, the first bottom layer data manager 626A provides the probability that a data value obtained by the system manager 602 is assigned to a data subset managed by the first bottom layer data manager 626A to the first intermediary layer data manager 616A. The first intermediary layer data manager 616A then transmits the probability to the first top layer data manager 606A, which in turn transmits the probability to the system manager 602. The system manager 602, upon determining that the data value belongs to a data subset managed by first bottom layer data manager 626A, transmits the data value to the first top layer data manager 606A. The data value is then transmitted down each layer of data managers until the data value is transmitted to the first bottom layer data manager 626A. In some embodiments, a higher layer data manager is operable to calculate the probability that the data value should be assigned to or passed to one of the lower layer data managers communicatively connected to the high layer data manager. For example, the first top layer data manager 606A, upon receipt of a data value, determines the probability that the data value should be assigned to the first intermediary data manager 616A and the probability that the data value should be assigned to the second intermediary data manager 616B. The first top layer data manager 606A then passes the data value to the intermediary data manager 616A or 616B having the highest probability for receiving the data value. This process is continued at each layer until the data value is passed to the bottom layer data manager having the highest probability for receiving the data value.

The first bottom layer data manager 626A, upon obtaining the data value, then stores the data value on a first partition 208A. In other embodiments, data values and instructions are directly transmitted between the system manager 602 and the bottom layer data managers 626A-626H. Although the embodiment of FIG. 6 illustrates a single system manager 602, in other embodiments, the data storage system 102 includes multiple system managers (not shown) that operate to assign different data subsets of the dataset and corresponding keys to different layered data managers. Further, although FIG. 6 illustrates that each bottom layer data manager 626A-626H stores data values on a single partition, in some embodiments, the bottom layer data managers 626A-626H may store data values on multiple partitions. In the foregoing financial transaction example, the first bottom layer data manager 626A stores each data value and key corresponding to a transaction that occurred within a first quarter of a first year of the two year period on the first partition 208A. In some embodiments, the first bottom layer data manager 626A may also store data values corresponding to transactions that occurred within the first quarter of the first year on other partitions (not shown) allocated to store the data values corresponding to financial transactions that occurred within half a year, a year, or a different duration of time. In one of such embodiments, the partitions 208A-208H are periodically updated to include only the most recent two years of transactions. In such embodiment, data values stored on the first partition 208A are periodically modified or replaced with data values corresponding to more recent financial transactions. However, since the bottom layer data manager 626A also stores a copy of the data values on a different partition allocated to store data values corresponding to financial transactions occurred within a different duration of time, the data values are maintained on the data storage system 102 even when the partitions 208A-208H are updated.

The data storage system 102 also includes one or more allocation managers (not shown). The allocation managers, similar to the allocation managers shown in FIGS. 2 and 4, are operable to determine whether to adjust the storage space of one or more of the partitions 208A-208H, and to dynamically readjust the storage space of the one or more partitions 208A-208H.

Figure 7:
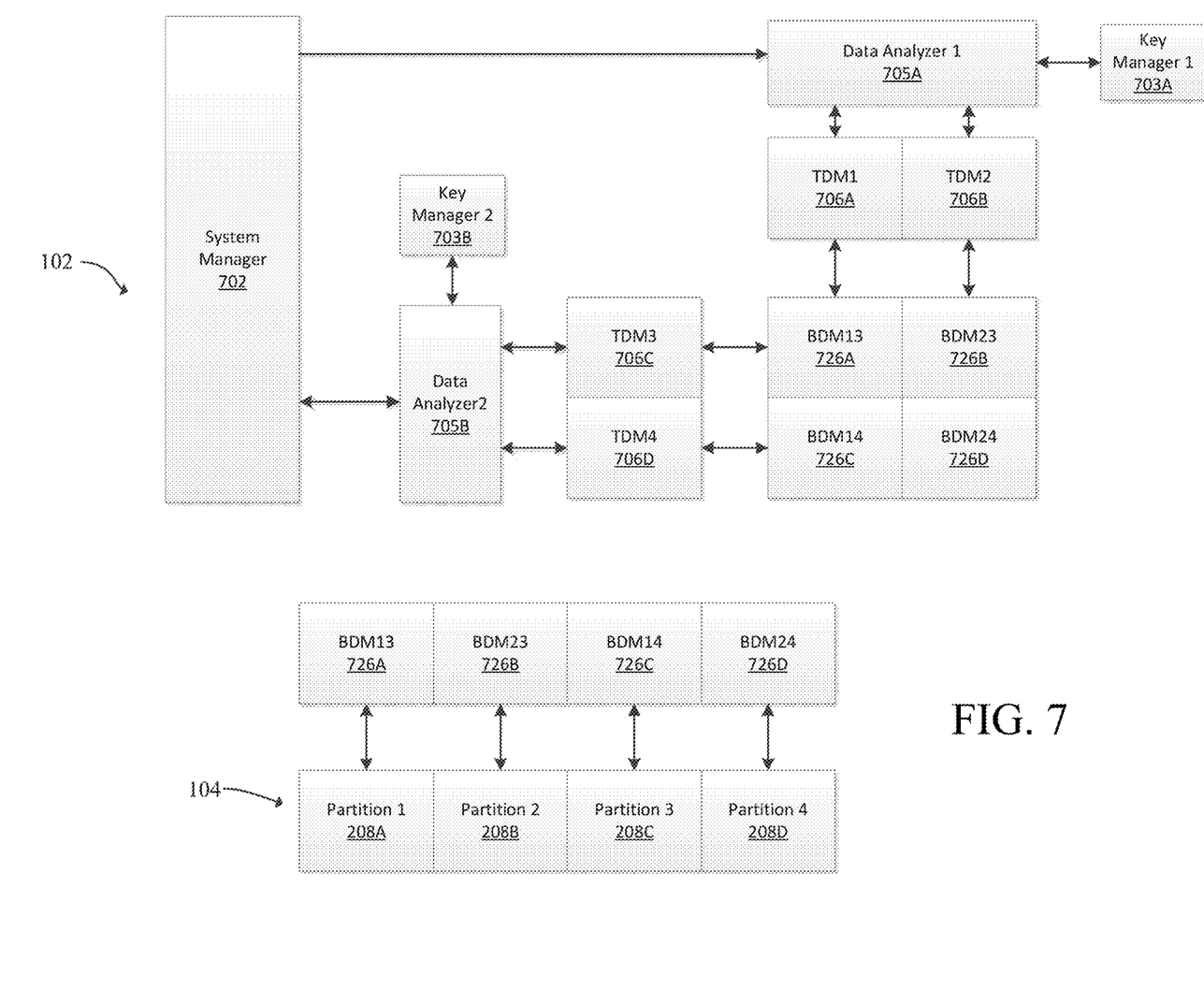
FIG. 7 is a schematic view of the data storage system of FIG. 1 having multiple layers of data managers in accordance with another embodiment.

FIG. 7 is a schematic view of the data storage system 102 of FIG. 1 having multiple layers of data managers in accordance with another embodiment. In some embodiments, data values belonging to approximately a first half (the first half) of the dataset are analyzed by a first data analyzer 705A. A first key manager 703A maps each data value of the first half of the dataset to a key of a key space, and assigns a key of the key space to each data value of the first half of the dataset. Further, a second data analyzer 705B analyzes data values belonging to approximately a second half (the second half) of the dataset. A second key manager 703B maps each data value of the second half of the dataset to a key of the key space, and assigns a key of the key space to each data value of the second half of the dataset.

The first data analyzer 705A provides the first half of keys of the key space to a first and a second top layer data manager 706A and 706B. The first top data layer data manager 706A obtains a first set of the first half of keys, divides the first set of the first half of keys into a first subset and a second subset of the first set of the first half of keys, and provides the first subset and the second subset to a first and a third bottom layer data manager 726A and 726C, respectively. Similarly, the second top layer data manager 706B obtains a second set of keys of the first half of keys, divides the second set of keys into a first subset and a second subset of the second set of keys, and provides the first subset and the second subset of the second set of keys to a second bottom layer data manager 726B and a fourth bottom layer data manager 726D, respectively.

The second data analyzer 705B provides the second half of keys of the key space to a third and a fourth top layer data manager 706C and 706D. The third top data layer data manager 706C obtains a first set of the second half of keys and divides the first set of the second half of keys into a first subset and a second subset of the first set of the second half of keys, and provides the first subset and the second subset of the first set of second half of keys to the first and the second bottom layer data manager 726A and 726B, respectively. Similarly, the fourth top layer data manager 706D obtains a second set of keys of the second half of keys, divides the second set of keys of the second half of keys into a first subset and a second subset of the second set of the second half of keys, and provides the first subset and the second subset of the second set of the second half of keys to a third bottom layer data manager 726C and a fourth bottom layer data manager 726D, respectively. Although the dataset and key space of the foregoing embodiment are divided to a first half and a second half, the dataset and key space may be divided into other ratios and managed by a different number of top layer data managers.

In some embodiments, the first subset of the first set of the first half of key space and the first subset of the first set of the second half of key space combine to include keys of a data subset assigned to the first bottom layer data manager 726A. Similarly, the first subset of the second set of the first half of key space and the second subset of the first set of the second half of key space combine to include keys of a data subset assigned to the second bottom layer data manager 726B. Further, the second subset of the first set of the first half of key space and the first subset of the second set of the second half of key space combine to include keys of a data subset assigned to the third bottom layer data manager 726C, and the second subset of the second set of the first half of key space and the second subset of the second set of the second half of key space combine to include keys of a data subset assigned to the fourth bottom layer data manager 726D.

Each bottom layer data manager 726A-726D stores data values belonging to data subsets assigned to the respective bottom layer data manager and corresponding subsets of keys on partitions 208A-208D, respectively. Further, similar to the embodiment illustrated in FIG. 6, data values and instructions may be transmitted between the system manager 702 and the bottom layer data managers 726A-726D via one or more top layer data managers 706A-706D. For example, the first bottom data manager 726A may transmit a probability that a key belonging to a first set of the first half of keys of the key space to the first top layer data manager 706A, and may transmit a probability that a key belonging to a first set of the second half of keys of the key space to the third top layer data manager 706C. The system manager 702, may transmit a data value having a key belonging to the first subset of the first half of the key space to the first bottom layer data manager 726A via the first top layer data manager 706A, and may transmits a data value having a key belonging to the first subset of the second half of the key space to the first bottom layer data manager 726A via the third top layer data manager 706C.

In further embodiments, the first bottom layer data manager 726A is assigned a data subset from the first top layer data manager 706A, a data subset from the third top layer data manager 706C, and two subsets of keys assigned to the two data subsets. Similarly, the second bottom layer data manager 726B is assigned a data subset from the second top layer data manager 706B, a data subset from the third top layer data manager 706C, and two subsets of keys assigned to the two data subsets. The third bottom layer data manager 726C is assigned a data subset from the first top layer data manager 706A, a data subset from the fourth top layer data manager 706D, and two subsets of keys assigned to the two data subsets. The fourth bottom layer data manager 726D is assigned a data subset from the second top layer data manager 706B, a data subset from the fourth top layer data manager 706D, and two subsets of keys assigned to the two data subsets.

In further embodiments, data values of the dataset include multiple parameters. For example, a dataset of financial security transactions includes a parameter based on transaction type (e.g., stock transaction, bond transaction, options transaction, forex transaction, as well as other types of transactions), a second parameter based on transaction settlement date, and a third parameter based on a type of entity that executed the financial transaction (individual, corporation, non-profit entity, as well as other entity classifications.). The first data analyzer 705A analyzes data values of the dataset for data values based on the transaction type and the second data analyzer 705B analyzes the data values of the dataset based on transaction date. The first key manager 703A maps each data value of the dataset to a first set of keys of the key space and assigns a key of the first set of keys of key space to each data value. Similarly, the second key manager 703B maps each data value of the dataset to a second set of the key of the space, and assigns a key of the second set of keys of the key space to each data value. The first, second, third, and fourth top layer data managers 706A-706D divide the keys mapped to the data values and provide the keys to the first, second, third, and fourth bottom layer data managers 726A-726D. Data values and instructions may be transmitted from the system manager 702 to the bottom layer data managers 726A-726D directly or through one of the top layer data managers 706A, 706B, 706C, or 706D.

In further embodiments, where data values of the dataset include multiple parameters, the first data analyzer 705A analyzes data values of the dataset for data values sharing a first common parameter, and the second data analyzer 705B analyzes the data values of the dataset for data values sharing a second common parameter. The first key manager 703A maps each data value of the dataset having a first common parameter to a key of the key space, and assigns a key of the key space to each data value of the dataset having the first common parameter. Similarly, the second key manager 703B maps each data value of the dataset having a second common parameter to a key of the key space, and assigns a key of the key space to each data value of the dataset having the second common parameter. Further, each of the first, second, third, and fourth top layer data managers 706A-706D divides the keys mapped to the data values and provides the keys to the first, second, third, and fourth bottom layer data managers 726A-726D. Data values and instructions may be transmitted from the system manager 702 to the bottom layer data managers 726A-726D directly or through one of the top layer data managers 706A, 706B, 706C, or 706D as disclosed herein.

Although FIG. 7 illustrates two data analyzers 705A and 705B and two key managers 703A and 703B, the data storage system 102 may include a different number of data analyzers and key managers to analyze data values and to assign keys to the data values. In some embodiments, the data storage system 102 includes a data analyzer that analyzes the content of each data value received by the data storage system 102 to determine whether to accept the received data value from the external sources 108, 110, 112, and 114. In one of such embodiments, the data analyzer is a packet sniffer that analyzes the content of data values transmitted from the external sources 108, 110, 112, and 114 prior to providing the data values to the system manager 202.

Further, although FIG. 7 illustrates four top layer data managers 706A-706D, no intermediary layer data managers, and four bottom layer data managers 726A-726D, the data storage system may include a different number of top layer data managers, intermediary layer data managers, and bottom layer data managers. In some embodiments, the bottom layer data manager 726A-726D each receives data values from two top layer data managers, thereby forming a two dimensional array. In further embodiments, the bottom layer data manager 726A-726D may each receive data values from three top layer data managers, thereby forming a three dimensional array. In further embodiments, the bottom layer data manager 726A-726D may each receive data values from four or more top layer data managers, thereby forming a multi-dimensional array.

As used in this specification and any claims of this application, the terms "computer", "server", "processor", and "memory" all refer to electronic or other technological devices. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

The above-disclosed embodiments have been presented for purposes of illustration and to enable one of ordinary skill in the art to practice the disclosure, but the disclosure is not intended to be exhaustive or limited to the forms disclosed. Many insubstantial modifications and variations will be apparent to those of ordinary skill in the art without departing from the scope and spirit of the disclosure. For instance, although the flowcharts depict a serial process, some of the steps/processes may be performed in parallel or out of sequence, or combined into a single step/process. The scope of the claims is intended to broadly cover the disclosed embodiments and any such modification.

The above disclosed embodiments have been presented for purposes of illustration and to enable one of ordinary skill in the art to practice the disclosed embodiments, but is not intended to be exhaustive or limited to the forms disclosed. Many insubstantial modifications and variations will be apparent to those of ordinary skill in the art without departing from the scope and spirit of the disclosure. For instance, although the flowcharts depict a serial process, some of the steps/blocks may be performed in parallel or out of sequence, or combined into a single step/block. The scope of the claims is intended to broadly cover the disclosed embodiments and any such modification.

As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, steps, operations, elements, and/or components, but do not preclude the presence or addition of one or more other features, steps, operations, elements, components, and/or groups thereof. In addition, the steps and components described in the above embodiments and figures are merely illustrative and do not imply that any particular step or component is a requirement of a claimed embodiment.

What is claimed is:

1. A computer-implemented method for storing data, comprising:
   receiving a data value of a dataset having a plurality of data subsets; assigning a key of a key space to each data value of the dataset; dividing the key space into a plurality of sets of keys;
   dividing each set of keys into a plurality of subsets of the set of keys,
   assigning each subset of the set of keys to a data subset of the plurality of data subsets;
   determining whether to readjust storage space of at least one partition of a plurality of partitions of a storage medium based on data values stored on the plurality of partitions; and
   in response to a determination to readjust the storage space of the at least one partition, dynamically re-mapping the key space to readjust a number of keys of the key space that are assigned to data values stored in the plurality of partitions based on a number of data values that are stored in the plurality of partitions.

2. The computer-implemented method of claim 1, further comprising:
   determining a frequency at which data values of the dataset are stored on the at least one partition,
   wherein determining whether to readjust the storage space of the at least one partition is based on the frequency at which data values of the dataset are stored on the at least one partition.

3. The computer-implemented method of claim 2, further comprising predicting whether to readjust the storage space of the at least one partition based on the frequency at which data values of the dataset are stored on the at least one partition within an operational duration.

4. The computer-implemented method of claim 3, wherein predicting whether to readjust the storage space of the at least one partition further comprises:
   predicting when a first partition of the plurality of partitions becomes saturated;
   increasing storage space of the first partition if the first partition is predicted to become saturated within a first threshold operational duration; and
   decreasing the storage space of the first partition if the first partition is not predicted to become saturated within a second threshold operational duration.

5. The computer-implemented method of claim 3, wherein predicting whether to readjust the storage space of the at least one partition further comprises:
   predicting when a first partition of the plurality of partitions becomes saturated; predicting when a second partition of the plurality of partitions becomes saturated; increasing storage space of the first partition if the first partition is predicted to become saturated sooner than the second partition; and
   decreasing the storage space of the first partition if the second partition is predicted to become saturated sooner than the first partition.

6. The computer-implemented method of claim 1, further comprising: determining a storage capacity of the at least one partition,
   wherein determining whether to readjust the storage space of the at least one partition is based on the storage capacity of the at least one partition.

7. The computer-implemented method of claim 1, further comprising:
   determining a number of data values stored on each partition of the plurality of partitions; increasing storage space of a first partition of the plurality of partitions if the number of data values stored on the first partition is greater than the number of data values stored on at least one other partition of the plurality of partitions; and
   decreasing the storage space of the first partition if the number of data values stored on the first partition is less than the number of data values stored on at least one other partition of the plurality of partitions.

8. The computer-implemented method of claim 7, further comprising: receiving a request to increase the storage space of the first partition;
   identifying a second partition of the plurality of partitions that is under-utilized;
   decreasing storage space of the second partition by a first value; and increasing the storage space of the first partition by the first value.

9. The computer-implemented method of claim 8, further comprising: identifying a third partition of the plurality of partitions that is under-utilized; decreasing storage space of the third partition by a second value; and increasing the storage space of the first partition by the second value.

10. The computer-implemented method of claim 9, further comprising combining the second partition and the third partition into a new partition.

11. A computer-implemented method for dynamically balancing storage space, comprising:
    receiving a data value of a dataset having a plurality of data subsets; assigning a key of a key space to each data value of the dataset; dividing the key space into a plurality of sets of keys;
    dividing each set of keys into a plurality of subsets of the set of keys, wherein each
    subset of the set of keys is assigned to a data subset of the plurality of data subsets; storing the data value on a partition of a plurality of partitions of a storage medium based on a value of a key assigned to the data value, the key being one or a plurality of keys of a key space, each key of the plurality of keys of the key space being assigned to a different data value of the dataset;
    after storing the data value on the partition, determining whether to readjust at least one partition of a plurality of partitions of the storage medium; and
    in response to a determination to readjust the storage space of the at least one partition, increasing storage space of a first partition of the at least one partition;
    decreasing storage space of a second partition of the at least one partition, wherein at least a portion of the storage space of the second partition that is decreased is allocated to the first partition; and re-mapping the key space to readjust a number of keys of the plurality of keys that are assigned to data values stored on the plurality of partitions based on a number of data values that are stored on the plurality of partitions.

12. The computer-implemented method of claim 11, further comprising: accessing one or more indicators of storage of data values of the dataset,
    wherein determining whether to readjust the at least one partition is based on the one or more indicators of storage of data values of the dataset.

13. The computer-implemented method of claim 11, further comprising:
    determining a frequency at which data values of the dataset are stored on the at least one partition, wherein determining whether to readjust the storage space of the at least one partition is based on the frequency at which data values of the dataset are stored on the at least one partition.

14. The computer-implemented method of claim 11, wherein in response to a determination to readjust the storage space of the at least one partition, the method further comprising: increasing a value of a first counter of a plurality of counters, the first counter being associated with a number of data values of the dataset that are stored on the first partition; and decreasing a value of a second counter of the plurality of counters, the second counter being associated with a number of data values of the dataset that are stored on the second partition.

15. The computer-implemented method of claim 11, further comprising generating a density map indicative of a frequency of data values of the dataset stored on the plurality of partitions.

16. A computer-implemented method for mapping keys of a key space, comprising:

assigning a plurality of keys of a key space to a plurality of data values of a dataset, wherein the dataset comprises a plurality of data subsets, wherein each key of the plurality of keys is an identifier of a corresponding data value, and wherein each key of the plurality of keys of the key space is assigned to a different data value of the dataset;

dividing the plurality of keys into a plurality of subsets of keys, wherein each subset of keys is initially assigned to a partition of a plurality of partitions, and wherein each partition is assigned to store data values of data belonging to a data subset of the plurality of data subsets;

periodically determining if storage space of at least one partition of the plurality of partitions has been readjusted; and in response to a determination that the storage space of the at least one partition has been readjusted, re-mapping the key space to readjust a number of keys of the plurality of keys that are assigned to data values stored on the plurality of partitions based on a number of data values that are stored on the plurality of partitions.

17. The computer-implemented method of claim 16, further comprising:

storing the plurality of keys of the key space on the plurality of partitions; and in response to receiving a first data value of the plurality of data values that is associated with a first key of the key space, determining a partition of the plurality of partitions to store the first data value based on a partition of the plurality of partitions that stores the first key of the key space.

18. The computer-implemented method of claim 16, wherein re-mapping the key space comprises:

determining if storage space of a first partition of the at least one partition has increased; in response to a determination that the storage space of the first partition has increased, increasing a number of keys assigned to data values stored on a first partition; determining storage space of a second partition of the at least one partition has decreased; and in response to a determination that the storage space of the second partition has decreased, decreasing a number of keys assigned to data values stored on the second partition.

19. The computer-implemented method of claim 16, wherein re-mapping the key space comprises:

predicting an increase to storage space of a first partition of the at least one partition within a first operational duration;

increasing a number of keys assigned to data values stored on a first partition in response to predicting that the storage space of the first partition will increase within the first operational duration;

predicting a decrease to storage space of a second partition of the at least one partition within a second operational duration; and decreasing a number of keys assigned to data values stored on the second partition in response to predicting that the storage space of the second partition will decrease within the second operational duration.

20. The computer-implemented method of claim 19, further comprising:

determining a frequency at which data values are stored on the first partition, wherein predicting the increase to the storage space of the first partition is based on the frequency at which data values are stored on the first partition; and determining a frequency at which data values are stored on the second partition, wherein predicting the decrease to the storage space of the second partition is based on the frequency at which data values are stored on the second partition.

* * * * *